(12) United States Patent
Häuslschmid et al.

(10) Patent No.: US 12,097,827 B2
(45) Date of Patent: Sep. 24, 2024

(54) EPB AND WSS CONNECTING SYSTEM

(71) Applicant: LEONI KABEL GMBH, Roth (DE)

(72) Inventors: Michael Häuslschmid, Emskirchen (DE); Erwin Köppendörfer, Schwabach (DE)

(73) Assignee: LEONI KABEL GMBH, Roth (DE)

( * ) Notice: Subject to any disclaimer, the term of this patent is extended or adjusted under 35 U.S.C. 154(b) by 525 days.

(21) Appl. No.: 17/422,820

(22) PCT Filed: Jan. 23, 2019

(86) PCT No.: PCT/IB2019/000080
§ 371 (c)(1),
(2) Date: Jul. 14, 2021

(87) PCT Pub. No.: WO2020/152493
PCT Pub. Date: Jul. 30, 2020

(65) Prior Publication Data
US 2022/0118960 A1      Apr. 21, 2022

(51) Int. Cl.
| | | |
|---|---|---|
| *B60T 13/74* | (2006.01) | |
| *B60R 16/03* | (2006.01) | |
| *B60T 7/12* | (2006.01) | |
| *B60T 13/66* | (2006.01) | |

(52) U.S. Cl.
CPC ............ *B60T 13/662* (2013.01); *B60R 16/03* (2013.01); *B60T 7/12* (2013.01); *B60T 2201/10* (2013.01); *B60T 2270/413* (2013.01); *B60T 2270/82* (2013.01)

(58) Field of Classification Search
CPC ...... B60T 13/662; B60T 7/12; B60T 2201/10; B60T 2270/413; B60T 2270/82; B60R 16/03

USPC .......... 303/3, 7, 15, 20; 188/71.5, 156–164; 701/22, 82, 83
See application file for complete search history.

(56) References Cited

U.S. PATENT DOCUMENTS

| | | | |
|---|---|---|---|
| 8,423,223 B2 | 4/2013 | Nakamura et al. | |
| 9,000,301 B2 * | 4/2015 | Hayakawa | B60R 16/0215 174/113 R |
| 2006/0108867 A1 * | 5/2006 | Ralea | B60T 8/1703 303/152 |

(Continued)

FOREIGN PATENT DOCUMENTS

| | | |
|---|---|---|
| CN | 201974485 U | 9/2011 |
| CN | 206344781 U | 7/2017 |

(Continued)

OTHER PUBLICATIONS

Chinese Appln 201980090069.9 Office Action—Jan. 15, 2024—Leoni Kabel Gmbh—.

*Primary Examiner* — Christopher P Schwartz
(74) *Attorney, Agent, or Firm* — Tarolli, Sundheim, Covell & Tummino LLP

(57) ABSTRACT

A two-wire connecting system for linking an Electronic Parking Brake and Wheel Speed Sensor to a vehicle control module utilizing a ternary analogous signal. One or more diodes are implemented in the connecting system to selectively power the Electronic Parking Brake and Wheel Speed Sensor. By halving the number of wires, the connecting system is lighter than traditional 4-wire connecting systems that link an Electronic Parking Brake and Wheel Speed Sensor with a control module.

21 Claims, 2 Drawing Sheets

(56) References Cited

U.S. PATENT DOCUMENTS

| | | | |
|---|---|---|---|
| 2011/0166744 A1* | 7/2011 | Lu | B60T 8/1755 |
| | | | 701/1 |
| 2012/0109470 A1* | 5/2012 | Amtsfeld | B60T 13/683 |
| | | | 701/48 |
| 2012/0330597 A1 | 12/2012 | Lammers | |
| 2013/0277087 A1 | 10/2013 | Hayakawa et al. | |
| 2016/0176369 A1* | 6/2016 | Ito | H01B 9/006 |
| | | | 174/72 A |
| 2018/0061525 A1* | 3/2018 | Kohori | H01B 7/295 |
| 2019/0299944 A1 | 10/2019 | Nilsson et al. | |

FOREIGN PATENT DOCUMENTS

| | | |
|---|---|---|
| CN | 107757593 A | 3/2018 |
| CN | 106462027 A | 2/2022 |

\* cited by examiner

US 12,097,827 B2

EPB AND WSS CONNECTING SYSTEM

CROSS REFERENCES TO RELATED APPLICATIONS

This application filed under 35 U.S.C § 371 is a national phase application of International Application Serial Number PCT/IB2019/000080 filed Jan. 23, 2019, the subject matter of which is incorporated herein by reference in its entirety.

FIELD OF INVENTION

This disclosure relates generally to brake-by-wire technology, and in particular to a two-wire connecting system for linking an Electronic Parking Brake (EPB) and Wheel Speed Sensors (WSS) to a control module.

BACKGROUND OF THE INVENTION

The art offers several systems for connecting an EPB and WSS to a control module. The latest advancements in drive-by-wire technology have already shaped the requirements that these systems are expected to meet. Of them, a crucial requirement relates to safety. It is an established fact that electronic devices are not perfect, and sooner or later most of them fail. In many scenarios, when these devices directly affect humans lives the law requires that they are designed and manufactured close to perfection in terms of overall reliability and safety. As time passes and more pertinent data is accumulated, it has become clear that all electronic systems in drive-by-wire, and especially in near-future driver-free applications, should be duplicated, if they can be duplicated, so that if one systems defaults or fails, the reserve system can immediately takes over corresponding functions. However, such duplication comes with a steep price tag and additionally increases a vehicles weight. Greater safety requirements and concerns, especially in e-mobility, and a lack of space given, need to be managed in view of increasing requirements on electricity demands. Since driverless vehicles are expected to hit the roads in five to ten years the demand for technologies that can help overcome these drawbacks is skyrocketing.

Various system are known in the art for connecting an EPB and WSS to a control module, which constitute a combination of two load wires for delivering power to the EPB and two data wires for delivering data from the WSS to a Vehicle Control Unit (VCU). In order to achieve a desired level of insulation between the load and data wires, additional separation films made of nonwovens or paper layers are conventionally used; and for the attenuation of interference between the EPB and WSS lines metal braids and foils (e.g., metal shielding) are usually utilized. Such a complex multi-layer structure of such a contemporary load/data design results in high manufacturing costs, while also resulting in a heavy weight cable, which is undesirable.

Thus, there is a need to provide technologies that reduce costs and the overall weight in the automotive industry, particularly in drive-by-wire applications. The present disclosure addresses these drawbacks, in particular, by providing a way to reduce weight and manufacturing costs of certain types of connecting systems, and specifically systems for linking an EPB and WSS to a control module.

SUMMARY OF THE INVENTION

Various illustrative embodiments of the present disclosure provide a connecting system. In accordance with one aspect of illustrative embodiments of the present disclosure, the system is used for linking the EPB and WSS to a control module.

The present disclosure provides a solution to the weight, space and manufacturing costs of electric connecting systems in general, and specifically for connecting systems, used for linking an EPB and WSS to an associated control module by halving the number of wires necessary for such connections.

According to current vehicle configurations, a WSS generates a low-frequency signal, generally not exceeding several kHz. The WSS is typically supplied by DC voltage and, when a vehicle moves, the sensor responds to wheel rotation and produces electric impulses. A conventional, passive WSS, comprises a magnetic rod with a wire wrapped around the magnetic rod. When a toothed metal ring, which is connected with a wheel, passes near the rod's external end, a magnetic flux of a solenoid varies, causing a variation of voltage at associated wire terminals of the WSS. The frequency of the generated sine AC signal is directly proportional to the wheel's angular velocity, and its amplitude rises when the angular velocity increases. Due to the law of electromagnetic induction the amplitude of an electromotive force depends on how quickly the solenoid's reluctance varies in time, and passive WSS's produce low-voltage signal when a wheel's angular velocity is low. A control module cannot typically read the WSS' signal at low speeds, for example speeds of 3-5 mph or lower.

According to current vehicle configurations, the EPB is an electromagnetic system that, when necessary, keeps a vehicle at a standstill by using a brushless DC motor, which through the EPB's gear train and spindle piston applies pressure to braking pads. Since the EPB is commonly used only when a vehicle is motionless or when its speed do not exceed 5 mph, the EPB is active when a vehicle is motionless and the WSS operates only when the vehicle is in motion.

According to an aspect of the present disclosure, a connection system for connecting an EPB and WSS to a control module includes a cable comprising a ground wire and a power wire. At a first end of the cable the ground wire and power wire are terminated and connected to terminals of a control module. At a second end of the cable the ground wire and power wire are split and terminated such that the ground wire and power wire are each connected to respective terminals of the EPB and WSS.

According to embodiments of a two-diode connecting system, a first diode is connected between the EPB and the power wire and a second diode is connected between the WSS and the power wire. According to certain embodiments, the first diode's positive terminal is connected to the EPB's power terminal, and the first diodes negative terminal is connected to the power wire. The second diode's negative terminal is connected to the WSS's power terminal, and the second diodes positive terminal connected to the power wire.

According to embodiments of a single-diode connecting system, a first diode is connected between the EPB and the power wire and the WSS is directly connected to the power wire. According to certain embodiments, the first diode's positive terminal is connected to the EPB's power terminal, and the first diodes negative terminal is connected to the power wire.

The connecting system of the present disclosure utilizes a ternary analogous power signal to access the WSS and EPB by adding a negative voltage mode to an EPB power wire, as well as by connecting either one diode into an EPB power wire; or placing one diode on the EBP power wire and one diode on a WSS power wire. Such configurations allow a control module to access both the EPB and WSS utilizing a two-wire cable. The supplied voltage, according to embodiments, may be provided by the control unit and/or is delivered from other vehicle systems.

BRIEF DESCRIPTION OF THE DRAWINGS

The following description is given as an example, and is not intended to limit the scope of the invention to the disclosed details, is made in conjunction with the accompanying drawings, wherein.

DETAILED DESCRIPTION

Detailed embodiments of the present connecting system and methods are disclosed herein; however, it is to be understood that the disclosed embodiments are merely illustrative of a connecting system, and methods that may be embodied in various forms. In addition, each of the examples given in connection with the various embodiments of the connecting systems and methods are intended to be illustrative, and not restrictive. Further, the drawings and photographs are not necessarily to scale, and some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present cable system, and methods.

When a vehicle is in motion, the WSS is active and EBP is not. When a vehicle is motionless, the EBP is active and WSS is motionless. Accordingly, the WSS and EBP do not usually operate simultaneously.

According to embodiments, and with the above in mind, a control module of the present disclosure may be configured to selectively supply power to the EPB or WSS. These embodiments allow a control module to access the EPB or WSS by two wires. This result is achieved by adding a negative voltage mode to a power wire, for example, by utilizing a ternary analog power signal on a power wire, which is further described in greater detail below.

Figure 1:
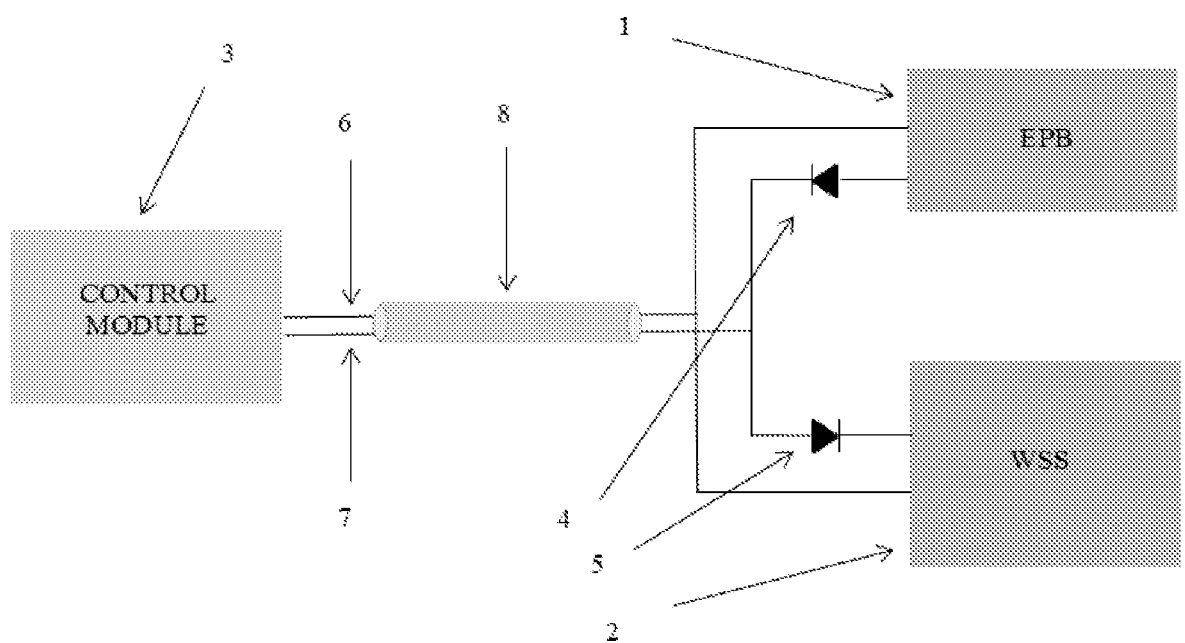
FIG. 1 shows a two-diode connecting system linking an EPB and WSS to a control module according to embodiments of the present disclosure.

With the reference to FIG. 1, an embodiment of a two-diode connecting system, which provides a link between the EPB 1 and a control module 3; and a link between the WSS 2 and the control module 3, is illustrated. The EBP 1 is connected to the control module 3 by a ground wire 6 and a power wire 7. A diode 4, which includes a positive terminal and a negative terminal, is further placed between the EPB 1 and power wire 7. According to embodiments, the positive terminal of diode 4 is connected to a power terminal of EPB 1. The negative terminal of diode 4 is connected to power wire 7.

The WSS 3 is also connected to the control module 3 by way of the ground wire 6 and the power wire 7. A diode 5, which includes a positive terminal and a negative terminal, is placed between the WSS 3 and power wire 7. According to embodiments, a negative terminal of diode 5 is connected to a power terminal of WSS 2. The positive terminal of diode 5 is connected to power wire 7.

According to embodiments, diodes 4, 5, are understood to be electrical components configured to selectively allow a current to pass through. According to certain embodiments, diodes 4, 5, are configured to allow a positive voltage to pass through a positive terminal and a negative voltage to pass through a negative terminal. Diodes 4, 5, prevent a negative voltage from passing through their positive terminal and similarly prevent a positive voltage from passing through their negative terminal. According to certain embodiments, diodes 4, 5, are understood as electrical components, electrical circuit or electrical devices, e.g., a transistor or the like.

According to embodiments, diodes 4, 5 are discrete electrical components (e.g., external units) that are connected to respective components of the system. According to alternative embodiments, diodes 4, 5 may be incorporated into the actuators/sensors (e.g., the EPB and WSS).

According to embodiments, when the control module 3 supplies a positive voltage on the power wire 7, the EPB related diode 4 blocks current flow into the EPB 1, whereas the WSS related diode 5 is open and allows current to flow through to the WSS 2. In this state the WSS 2 receives power and is thus active, whereas EPB 1 remains unpowered and inactive. When the control module 3 provides a negative voltage on the power wire 7, the WSS related diode 5 blocks a flow of a current into the WSS 2, whereas the EPB 1 related diode 4 allows current flow though the EPB 1, thus powering the EPB. As a result, the EBP 1 is active, and the WSS 2 is not.

According to these embodiments, selectively supplying positive and negative voltages over power wire 7 selectively powers the WSS 2 and EPB 1, according to the configuration of diodes 4, 5. In this way, a single power wire 7 may be used to power both the EPB 1 and WSS 2. According to these embodiments, and as is understood based upon the above description, the present system requires the supply of both a positive voltage and a negative voltage in order to selectively power the WSS 2 and EPB 1. Such a dual voltage (i.e., positive and negative) may be generated from control module 3 or provided from an external power source (not shown).

Figure 2:
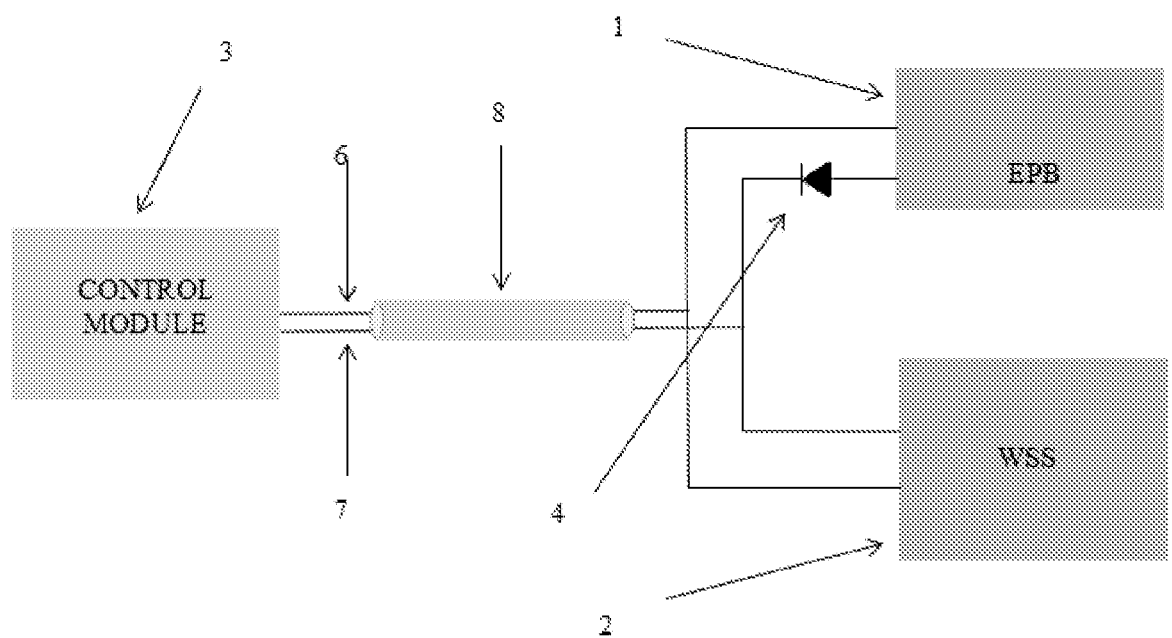
FIG. 2 shows a single-diode connecting system, linking an EPB and WSS to a control module according to embodiments of the present disclosure.

With the reference to FIG. 2, an embodiment of a single-diode connecting system, which provides a link between the EPB 1 and a control module 3; and a link between the WSS 2 and the control module 3, is illustrated. The EBP 1 is connected to the control module 3 by a ground wire 6 and a power wire 7. A diode 4, which includes a positive terminal and a negative terminal, is further placed between the EPB 1 and power wire 7. According to embodiments, the positive terminal of diode 4 is connected to a power terminal of EPB 1. The negative terminal of diode 4 is connected to power wire 7.

According to these embodiments, when the control module 3 provides a positive voltage on power wire 7, WSS 2 receives power, and is thus active. However, diode 4 blocks a flow of a current into the EPB 1, and thus EPB remains unpowered and inactive. When the control module 3 delivers a negative voltage on power wire 7 both the WSS 2 and EPB 1 are active because a diode 4 no longer blocks a flow of a current into EPB 1. According to such a configuration, the EPB and WSS are connected in parallel to each other. But since the EPB 1 consumes significantly more power (e.g., at least ten times more) than the WSS, the WSS does not significantly influence the operation of the EPB 1. This is further evidenced by the knowledge that at speeds below 3-5 mph, the control module 3 does not or cannot generally read passive signals coming from WSS 2 because at these speeds such signals become virtually indiscernible due to their low amplitude.

According to embodiments implementing either the single-diode or two-diode configurations, a higher voltage may be applied. For example, the maximum power of a DC motor of the EPB is substantially invariable regardless of the voltage, utilization of higher voltage makes it possible to proportionally reduce the cross-section areas of the wires 6, 7. Particularly, according to these embodiments, the absolute voltage on wires 6, 7 may be increased from conventional 12 V, by up to a factor of 4, including, i.e., up to 48 V. Such an increase in voltage allows for a proportional, i.e., by a factor of 4, reduction in the cross-sectional areas of power wires 6, 7. Since the volume of conductors used in the wires is decreased in proportion to the increase in the applied voltage, i.e., by a factor of 4, the connecting system of the present disclosure has its overall weight decreased by the same factor. As a result, the overall weight of the wires and the associated manufacturing costs of the connecting system decreases. For example, the quadrupling of the absolute voltage makes it possible to reduce the cross-section areas of the wires 6, 7 by a factor of four. By keeping in mind that the current technological trend in the industry is the transition to 48V electrical systems standard, this embodiment is expected to be especially advantageous when implemented within the scope of this electrical systems standard. Moreover, reducing the cross-sectional areas of power wires 6, 7 advantageously allows for smaller bending-radii (or more cycles with the same radii), which provides for better mechanical loading.

According to embodiments, when a higher absolute voltage on wires 6, 7 is implemented, a power supply may be implemented, which supplies a voltage level higher than an on-board power supply. For example, and as illustrated by the above disclosure, typically automobiles utilize an on-board power supply that supplies a 12V standard. In such situations, a separate power supply is implemented, for example, a power supply integrated into the control module 3, which supplies a higher voltage (e.g., 48V) to the WSS and EPB. In such configurations, a junction to junction voltage level of the control module 3 is different than the on-board voltage level.

According to further embodiments, an active WSS may be incorporated, which utilizes a Hall Effect. Such an active WSS includes three terminals—a power, a ground, and a signal terminal Such a WSS produces a digital voltage and can advantageously measure very low angular speeds, and can determine the direction of a wheel's rotation. The connecting system of the present disclosure may be used with active WSS by implementing a third wire (not shown), which connects the signal terminal of an active WSS and the control module. This third wire may be included in cable 8.

What is claimed is:

1. A connecting system for connecting an electric parking brake mechanism and a wheel speed sensor of a vehicle with a controller, comprising:
   a control module configured to control the electric parking brake mechanism and the wheel speed sensor;
   a cable having a first end and a second end, comprising:
      a ground wire and a power wire;
   a first diode associated with the electric parking brake mechanism; and
   a second diode associated with the wheel speed sensor, wherein the first and second diodes cooperate to allow power to only one of the electric parking brake mechanism and the wheel speed sensor at a time.

2. The connecting system of claim 1, wherein a ground terminal of the ground wire at the first end of the cable is connected to a ground terminal of the control module; and wherein a power terminal of the power wire at the first end of the cable is connected to a power terminal of a control module.

3. The connecting system of claim 1, wherein a ground terminal of the ground wire at the second end of the cable is connected to a ground terminal of the electric parking brake mechanism; and wherein the ground terminal of the ground wire at the second end of the cable is connected to a ground terminal of the wheel speed sensor.

4. The connecting system of claim 1, wherein a power terminal of the power wire at the second end of the cable is connected to a negative terminal of the first diode associated with the electric parking brake mechanism; and wherein the power terminal of the power wire at the second end of the cable is connected to a positive terminal of the second diode associated with the wheel speed sensor.

5. The connecting system of claim 1, wherein a positive terminal of the first diode associated with the electric parking brake mechanism is connected to a power terminal of the electric parking brake mechanism; and wherein a negative terminal of the second diode associated with the wheel speed sensor is connected to a power terminal of the wheel speed sensor.

6. The connecting system of claim 1, wherein the control module is configured to selectively supply a positive and negative voltage to the power wire of the cable; and wherein the first diode is configured to block a positive voltage on the power wire from reaching the electric parking brake mechanism; and wherein the second diode is configured to block a negative voltage on the power wire from reaching the wheel speed sensor.

7. The connecting system of claim 1, wherein absolute voltage on a power terminal of the control module does not exceed 48 V.

8. The connecting system of claim 1, wherein the first diode is integrated into the electric parking brake mechanism, and wherein the second diode is integrated into the wheel speed sensor.

9. The connecting system of claim 1, wherein the control module comprises an integrated power supply, the integrated power supply configured to supply both a positive voltage level and a negative voltage level.

10. The connecting system of claim 1, wherein the control module comprises an integrated power supply, the integrated power supply configured to supply a higher voltage than an on-board power supply of the vehicle.

11. The connecting system of claim 1, wherein the first diode and the second diode are arranged in parallel with the electric parking brake mechanism and the wheel speed sensor on the same wheel.

12. A connecting system for connecting an electric parking brake mechanism and a wheel speed sensor of a vehicle with a controller, comprising:
   a control module configured to control the electric parking brake mechanism and the wheel speed sensor;

a cable having a first end and a second end, comprising:
a ground wire and a power wire for delivering power from the control module to at least one of the electric parking brake mechanism and the wheel speed sensor; and
a diode connected to the power wire and associated with the electric parking brake mechanism such that the polarity of the power provided to the power wire determines whether power is delivered to both the electric parking brake mechanism and the wheel speed sensor or only to the wheel speed sensor.

13. The connecting system of claim 12,
wherein a ground terminal of the ground wire at the first end of the cable is connected to a ground terminal of the control module; and
wherein a power terminal of the power wire at the first end of the cable is connected to a power terminal of a control module.

14. The connecting system of claim 12,
wherein a ground terminal of the ground wire at the second end of the cable is connected to a ground terminal of the electric parking brake mechanism; and
wherein the ground terminal of the ground wire at the second end of the cable is connected to a ground terminal of the wheel speed sensor.

15. The connecting system of claim 12,
wherein a power terminal of the power wire at the second end of the cable is connected to a negative terminal of the diode associated with the electric parking brake mechanism.

16. The connecting system of claim 12,
wherein a positive terminal of the diode associated with the electric parking brake mechanism is connected to a power terminal of the electric parking brake mechanism.

17. The connecting system of claim 12,
wherein the a control module is configured to selectively supply a positive and negative voltage to the power wire of the cable; and
wherein the diode is configured to block a positive voltage on the power wire from reaching the electric parking brake mechanism.

18. The connecting system of claim 12, wherein the diode is integrated into the electric parking brake mechanism.

19. The connecting system of claim 12, wherein the control module comprises an integrated power supply, the integrated power supply configured to supply both a positive voltage level and a negative voltage level.

20. The connecting system of claim 12, wherein the control module comprises an integrated power supply, the integrated power supply configured to supply a higher voltage than an on-board power supply of the vehicle.

21. The connecting system of claim 12, wherein absolute voltage on a power terminal of the control module does not exceed 48 V.

* * * * *